US 6,513,972 B1

(12) United States Patent
Jenkins (10) Patent No.: US 6,513,972 B1
(45) Date of Patent: Feb. 4, 2003

(54) OPTICAL TEMPERATURE PROBE, MONITORING SYSTEM, AND RELATED METHODS

(75) Inventor: Maurice A. Jenkins, Casselberry, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 26 days.

(21) Appl. No.: 09/707,519

(22) Filed: Nov. 7, 2000

Related U.S. Application Data (63) Continuation-in-part of application No. 09/651,937, filed on Aug. 31, 2000.

(51) Int. Cl.⁷ ............................ G01K 11/00; G01K 1/02; G01K 1/16
(52) U.S. Cl. ........................................ 374/161; 374/152
(58) Field of Search ................................ 374/161, 162, 374/152, 121, 180, 132, 208

(56) References Cited

U.S. PATENT DOCUMENTS

| | | | |
|---|---|---|---|
| 4,203,326 A | 5/1980 | Gottlieb et al. | 73/339 |
| 4,307,607 A | 12/1981 | Saaski et al. | |
| 4,364,032 A | 12/1982 | Narato et al. | 340/679 |
| 4,409,476 A | * 10/1983 | Lofgren et al. | 250/227 |
| 4,733,255 A | 3/1988 | Uematsu et al. | 340/584 |
| 4,818,975 A | 4/1989 | Jenkins | 340/584 |
| 5,128,535 A | 7/1992 | Bock et al. | 250/227 |
| 5,211,478 A | * 5/1993 | Horsley | 374/125 |
| 5,550,629 A | 8/1996 | Shapanus et al. | 356/72 |
| 5,626,139 A | * 5/1997 | Szeles et al. | 374/131 |
| 5,720,556 A | * 2/1998 | Krellner | 374/185 |
| 6,014,076 A | 1/2000 | Luzzader | 340/521 |
| 6,099,162 A | * 8/2000 | Walsh | 374/30 |
| 6,220,750 B1 | * 4/2001 | Palti | 374/164 |
| 6,283,632 B1 | * 9/2001 | Takaki | 374/161 |

FOREIGN PATENT DOCUMENTS

| | | | | |
|---|---|---|---|---|
| FR | 2319120 A | | 2/1977 | |
| GB | 2209830 A | * | 5/1989 | 374/161 |
| JP | 0122124 | * | 9/1980 | 374/161 |
| JP | 0079928 | * | 6/1981 | 374/161 |
| JP | 0079416 | * | 5/1982 | 374/161 |
| JP | 58014021 A | | 1/1983 | |
| JP | 0115333 | * | 7/1983 | 374/161 |
| JP | 0153133 | * | 9/1983 | 374/161 |
| JP | 0162824 | * | 9/1983 | 374/161 |
| JP | 0042432 | * | 2/1988 | 374/161 |
| SU | 0992538 | * | 4/1982 | 374/161 |

* cited by examiner

Primary Examiner—Diego Gutierrez
Assistant Examiner—Gail Verbitsky

(57) ABSTRACT

An apparatus and method for monitoring temperature of one or more components of a multi-component system, such as a power generator system, using at least one temperature probe (20) are provided. Each temperature probe includes a temperature probe container (25) enclosing at least one light window (30) responsive to temperature variation and a light-guide pair (40) corresponding to each such light window (30). Each light guide pair (40) preferably has first (41) and second (42) strands for conveying light to the corresponding light window (30) and receiving light passing through a light window (30), respectively. Light can be provided from an external light source (51), and light passing through a light window (30) can be detected by an external light sensor (52). A temperature probe light window (30) passes light if its temperature is within a predetermined range or otherwise blocks light. The temperature probe container (25) is preferably constructed from a heat conducting material having a sufficiently high thermal conductivity coefficient to ensure rapid efficient transmission of temperature information to a temperature responsive light window (30).

24 Claims, 5 Drawing Sheets

OPTICAL TEMPERATURE PROBE, MONITORING SYSTEM, AND RELATED METHODS

RELATED INVENTIONS

This application is a continuation-in-part of co-pending application Ser. No. 09/651,937, filed Aug. 31, 2000, the entire disclosure of which is incorporated herein by reference.

FIELD OF THE INVENTION

This invention is related to multiple-component electrical systems such as those used in the power generation industry and, more particularly, to the field of monitoring conditions of electrical generator systems.

BACKGROUND OF THE INVENTION

In the power generation industry, monitoring the conditions of components of electrical generator systems is essential for the efficient and nonhazardous functioning of such systems. Effective monitoring encompasses detecting and registering conditions in various components including generators, exciters, collectors and large utility transformers. Conventional techniques for monitoring the temperature of such components use thermocouples or resistance temperature detector devices which convey temperature information with conductors. Such devices and techniques, however, are limited and have significant drawbacks. For example, the devices cannot be routed across components operating at high voltage nor where there is a risk of flash-over or electromotive force (emf) distortion. The ability to measure accurately the temperature of a component is thus further limited because temperature measuring devices cannot be positioned in proximity to critical areas whose temperatures it is desirable to monitor. Therefore, critical areas cannot be well-monitored using these conventional devices and methods.

These limitations on monitoring the condition of power generator systems, moreover, often necessitate monitoring by visual means, which, in turn, may require shutting down a system and imposing costs associated with the downtime of the system while visual inspections are performed. Moreover, because visual monitoring can only be undertaken at intermittent intervals, there is no capability for continuous monitoring of electrical system components. Thus, such conventional techniques and devices suffer deficiencies in terms of both efficiency and efficacy. Conventional techniques are more costly whenever monitoring requires suspending system operations. They also are inevitably less reliable when they can not monitor each component's temperature accurately or can not measure temperature continuously throughout the system.

Other devices and methods have been tried for certain types of components, but these are also subject to limitations and constraints on efficiency and efficacy. For example, U.S. Pat. No. 4,818,975 by Jenkins titled "Generator Stator Core Temperature Monitor" proposes measuring ambient temperature of the stator core of a generator in terms of hydrogen gas ($H_2$) exiting through the stator core. Temperature of the core can be inferred from either of two effects: (1) the hotter the gas, the more frequent the gas molecules impinge on a temperature-responsive liquid crystal so as to block monitored light; and (2) the hotter the gas, the greater the expansion of a housing-mounted flexible bladder thereby influencing the angle and hence amount of light detected. There are at least two limitations with this type of monitoring, however. First, owing to the relative diffusion of gas molecules, gas is a less efficient heat conductor. Accordingly, the hydrogen gas is a less efficient, less reliable conveyor of temperature information. Second, and more fundamentally, this type of monitoring measures only an aggregate or average temperature of the environment surrounding the stator, not the actual temperature of a specific system component. This can be especially limiting given the need to detect and isolate a temperature variation occurring in individual components. Measuring ambient temperature does not permit separate monitoring and detecting of temperature variations in individual components. Detection, moreover, is also delayed until, for example, an overheating condition in a single component contributes sufficient heat to raise the average or ambient temperature surrounding the stator or other electrical system.

U.S. Pat. No. 4,203,326, by Gottlieb et al. titled "Method and Means for Improved Optical Temperature Sensor" proposes an "optical conductor" to measure temperature, but does not address directly the problems of the more conventional type conductor temperature information conveyors. Such devices combine an optical core with cladding, along with a jacket to encase the core and clad material. The core and clad material are formed so as to produce a temperature-influenced difference in refractive indexes that is intended to overcome a common problem with such conductors: temperature responsiveness varies linearly with the length of the conductor. But whatever deficiencies may be corrected with respect to this conductor-length factor, such a device registers only a temperature range and does not address other problems described above. Moreover, there are additional limitations inherent in such devices that limit the efficiency with which temperature detection can be performed. For example, thermal disruption of the fiber conductor by melting in the fiber or surrounding cladding disturbs light conduction. Although using different cladding material can compensate for this risk, doing so can further complicate choosing a proper material composition that will provide the correct refractive indexes difference to accurately monitor for temperature variation. Finally, in addition to their above-described complications in achieving a desired result, such devices also are fundamentally limited in the result that is achieved. Specifically, such devices provide detection of only a range of temperatures, thereby providing less-than-desirable accuracy and problematic delay in monitoring for critical conditions like overheating in an electrical system component.

There is thus a critical need for an apparatus or method that overcomes the problems inherent in conventional and optical conductor type devices for monitoring electrical generator components. Specifically, there is the need for a device or method that more accurately and more efficiently measures the temperatures of the distinct components of a power generator system, as well as the ambient temperature of the system at various locations.

SUMMARY OF THE INVENTION

In view of the foregoing background, the present invention advantageously provides an apparatus and method for efficiently and efficaciously monitoring the temperature of one or more regions or components of a multiple-component system, such as a power generator system wherein one confronts such inhibiting factors as high voltage and flash-over risk. The present invention advantageously provides a more accurate capability for monitoring temperature and detecting temperature variation in electrical system components. Moreover, although the apparatus and method are described herein in the context of electrical generator systems, they can have wide applicability in other contexts as will be apparent to one skilled in the art. Such uses include monitoring air conditioning systems and other building service devices whose temperatures need to be monitored effectively and efficiently on a substantially continuous basis. Specifically, as described herein, vital temperature information using the apparatus and method of the present invention is directed efficiently and rapidly to a temperature variation monitor so as to monitor critical temperature variations in a direct, efficient, and reliable manner.

Further advantage is provided in that critical temperature information can be conveyed from within the system to a remote site. This provides capabilities for safe, continuous temperature monitoring using the apparatus and method of the present invention. Notwithstanding this significant advantage, the present invention can be used just as effectively for direct local monitoring of a system component's temperature.

The present invention, moreover, specifically provides the capability of strategically positioning a plurality of temperature monitoring devices or "temperature probes" within any number of selected critical areas within an electrical generator system. Moreover, the present invention allows these temperature probes to be placed adjacent one or more system components or even to be attached directly to the components. This provides capabilities for monitoring and detecting temperature variations of a plurality of discrete components within the system as opposed to only measuring an average temperature in the form of ambient temperature of the overall system. Again, the present invention permits multiple component monitoring from a remote location external to the electrical generator system as well as direct, on-site temperature monitoring.

The apparatus and method of the present invention provide an effective, efficient temperature probe. The temperature probe preferably comprises a light source, a light sensor, and at least one light window contained within a temperature probe container, and wherein the light window further has an associated pair of light guides. Temperature information is conveyed rapidly and efficiently to the outer surface of the temperature probe container. The container is purposely formed of a heat conducting material, preferably having a thermal conductivity coefficient of 100 or more, so as to rapidly convey temperature information from the surface of the container to the inner surface to which are attached one or more light windows. Alternatively, a thermal conducting member can extend through the container to contact at one portion an outer surface or open-air environment and convey temperature information to another portion within the container that is in contact with the one or more light windows.

Thus, using the present invention, one is able to convey temperature information directly via a thermal conductor linking one or more light windows contained within the container of the temperature probe. As already noted, the temperature probe so described can be adjacent or contact one or more electrical system components whose temperature is to be directly monitored. More specifically, the light source and light sensor can be positioned outside of the electrical generator system while the temperature probes are positioned within the system at any selected critical point at which temperature is to be monitored. The light guide pair associated with each light window preferably each has at least one strand to convey light from the light source to the corresponding light window.

Each light window is responsive to temperature in that each window & perviousness to light is a function of the window's temperature; that is, the amount of light, if any, that will pass through the window will depend on the window's temperature. For example, a light window formed from a liquid crystal will be more or less permeable to radiant energy in the form of light depending on the temperature of the window. Indeed, depending on the specific properties of the liquid crystal the window may be completely transparent or completely opaque. Accordingly, the intensity of light passing through a light window will depend on the degree to which the liquid crystal is pervious to radiant energy, which in turn is a function of the specific temperature of the crystal. By measuring the intensity of light, if any, one can measure temperature based on the information received by the temperature probe.

Light intensity is determined by the amount of light captured by the second strand of the light guide pair, which, positioned on the opposing surface of the light window, receives any light conveyed to the window from the light source via the first strand. Captured light is conveyed by the second strand of the light guide pair to a light sensor which measures over a roughly continuous range the intensity of the light received via the second strand. Temperature is thus monitored by measuring the intensity of the light which the light windows of a temperature probe are passing to the light sensor. The greater the number of light windows, the finer is the gradation of temperature ranges which can be discerned.

The temperature probes receive temperature information directly and, virtually instantaneously from a thermal conducting connector in communication with a surface of the component whose temperature is to be monitored and convey that information in the form of light-guide transmitted signals, i.e., light, through the light windows contained within the temperature probe container. A specific advantage of the present invention is the ability of the heat conductor to convey accurate temperature information. The conductor is in direct contact with a surface portion of the select component whose temperature is to be monitored. The temperature so measured is that of the specific component rather than an aggregate or average of the system, as taught by existing conventional and optics-based devices.

Whereas other methods and devices detect variation in ambient temperature by registering increased or more rapid average impingement of gas molecules on the surface of a liquid crystal to raise the temperature of the crystal, the present invention uses a heat conductor having high thermal conductivity. More specifically, recognizing that temperature information is transferred more rapidly through a medium having a fixed structural arrangement, the present invention employs a thermal conducting medium that preferably is a metal or other medium having a sufficiently high coefficient of heat conduction. Thus, the translational (or kinetic), rotational, and vibrational energy is transmitted more rapidly and exchanged more efficiently with a temperature-sensitive liquid crystal device. This, then, increases the speed and accuracy with which temperature information can be conveyed, as noted above. Thus the present invention in contrast to other devices and methods advantageously allows earlier and more accurate detection of temperature variation in electrical system components. It is the temperature of the component itself that is conveyed rather than a proxy in the form of the ambient or system environment temperature. The temperature information conveyed is accordingly more accurate because the heat conductor can preferably be a metal, and moreover, the temperature information is conveyed rapidly as compared to conventional and other optics-based devices.

Yet a further advantage is provided by using the light guides described above, which can enable the routing of the temperature probes across virtually any component without the concerns of high voltage or flash-over that would otherwise arise with conventional devices and methods. In a related vein, the lightweight light guides and light windows corresponding to each temperature probe ensure a lighter assembly as compared to conventional temperature monitoring devices. This provides further advantages where weight is a critical factor such as in aerospace and other non-land based applications.

Moreover there is the ability already noted, to utilize multiple temperature probes for monitoring not merely an ambient temperature proxy or average temperature of a multiple-component system, but also to monitor the temperature of each component. These features, then, help enable the additional advantage of measuring distinct components within, for example, the same electrical generator system. Therefore, because distinct temperature information rather than an aggregate is conveyed for each selected component, the individual components can be simultaneously monitored within the electrical generator system, whereas with conventional devices and methods there is no capability for distinguishing which of several components is contributing what temperature to the overall system temperature. Thus, it is possible to effect simultaneous monitoring of the multiple components within an electrical generator system—generator, exciters, collectors, transformers, etc.—while having the capability to identify through early detection which of the various components may be overheating or otherwise reaching an unacceptable temperature range.

BRIEF DESCRIPTION OF THE INVENTION

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

Figure 1:
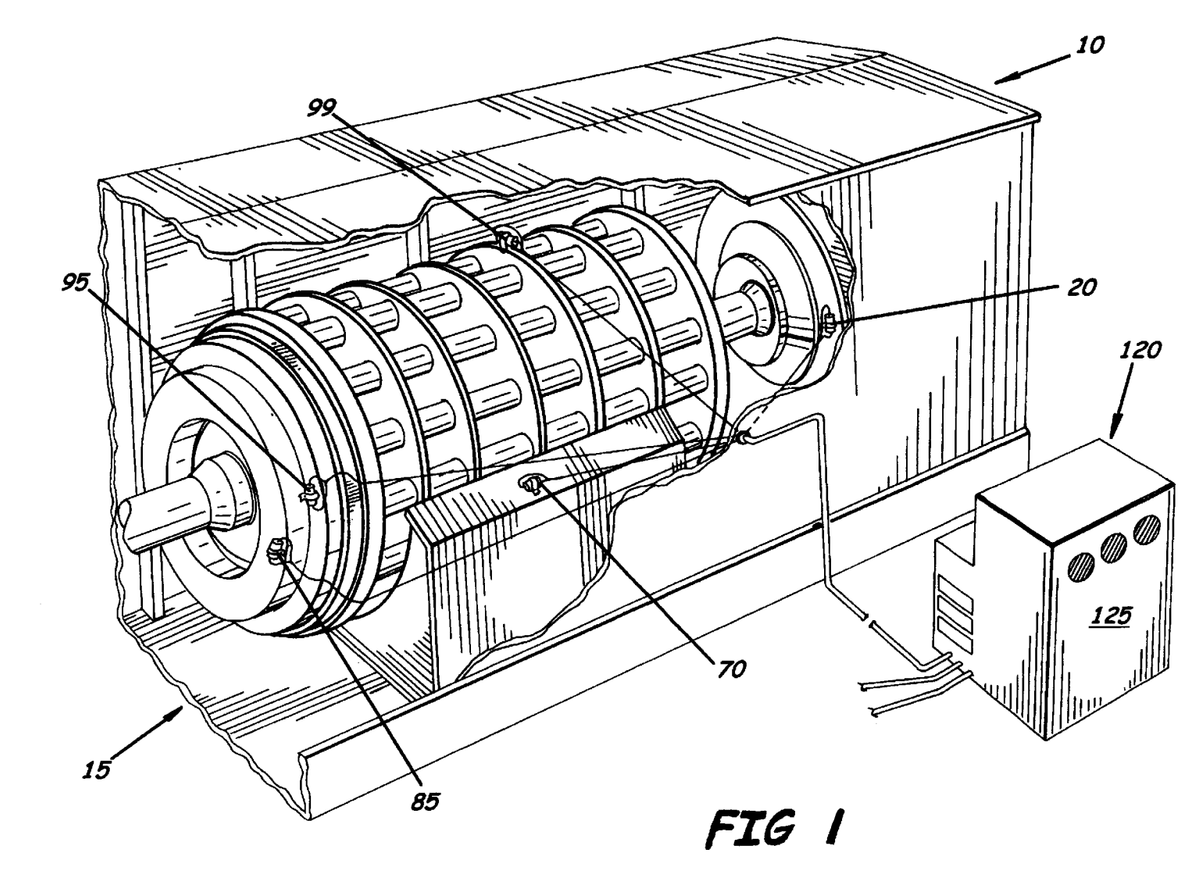
FIG. 1 is a perspective view of a system to monitor temperature of distinct components of an electrical generator system according to the present invention.

FIG. 1 illustrates a system 10 for monitoring the individual temperatures of distinct components of an electrical generator system 15 using five separate temperature probes 20, 70, 85, 95, 99 connected to the distinct components of the electrical generator system 15. As further illustrated in FIGS. 2 and 3, an individual temperature probe 20 preferably comprises a container 25 containing at least one light window 30 and a light-guide pair 40 associated with each light window 30. More specifically, the temperature probe container 25 will have an outer surface 22 and inner surface 24 surrounding a hollow region. The one or more light windows 30 is preferably connected to at least a portion of the inner surface 24 of the container 25. A light-guide pair 40 preferably will be formed of a first strand 41 and a second strand 42. The first strand 41 of a light-guide pair 40 will extend through the first end of the container 25 and be positioned adjacent a first surface 31 of a corresponding light window 30. The second strand 42 of a light guide pair 40 will be positioned adjacent a second, opposing surface portion 32 of the corresponding light window 30 and extend through the second end of the container 25.

For example, the temperature probe container 25 can be cylindrical-shaped as illustrated in FIGS. 1–5. Such a cylindrically-shaped container, further can have first 21 and second 22 end portions that are each substantially flat and positioned perpendicular to a center longitudinal axis of the container 25. Within the hollow region of the cylindrically-shaped container 25 is at least one light window 30 having first 31 and second 32 opposing surfaces. Alternatively, the container might have a rectangular or other shape specifically designed to be well-positioned within the confines of a system such as an electrical generator system 15. As further illustrated in FIGS. 6A–6C, a temperature probe 20 having more than one light window 38, 68, 98 will have a light-guide pair 40, 43, 46 corresponding to each one of the light windows 38, 68, 98. As perhaps best illustrated in FIGS. 2 and 3, an individual light-guide pair 40 preferably will be composed of two light conveying strands 41, 42 (e.g., fiber optical strands). Each will have first and second ends. The first strand 41 of a light-guide pair 40 preferably has a first end positioned adjacent a light source 51 (e.g., a light emitting diode (LED)) external to the container 25. The first strand 41 then extends through the surface of the container 25.

Figure 2:
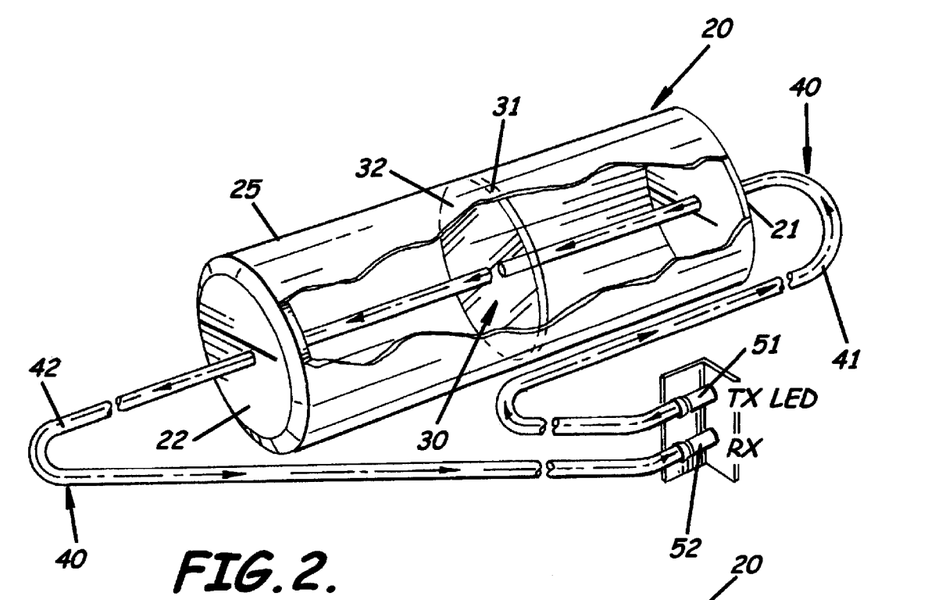
FIG. 2 is a perspective view of a single temperature probe according to the present invention.
Figure 3:
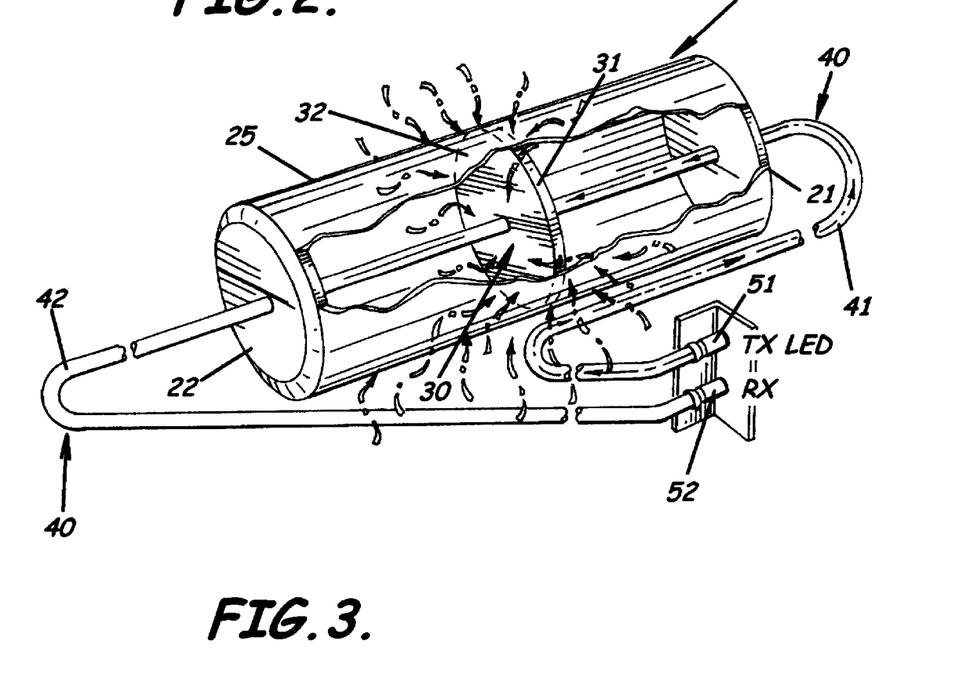
FIG 3 is a perspective view of a single temperature robe according to the present invention.

As further illustrated in FIGS. 2 and 3, for a cylindrically-shaped container, the first light-guide strand 41 extends through the flat end portion 21 of the container 25 and the second end of the strand is positioned adjacent to the first surface portion 31 of a corresponding light window 30. Light is thus conveyed from the external light source 51 to the surface of the light window 30. Light that is not completely blocked by a light window 30 will then pass through the light window to be captured at a first end of the second light strand 42 of the light-guide pair 40 positioned adjacent the opposing surface 32 of the corresponding light window 30. Captured light will be conveyed by the second strand 42 of the light-guide pair 40, which extends through the opposing end 22 of the container 25, to a light sensor 52 positioned outside of the temperature probe container 25.

The intensity of the light that is conveyed through a light window 30 will be determined by the temperature of the light window 30, the light window 30 being composed of a temperature-responsive material such as a liquid crystal, which can be manufactured according to specific temperature detection requirements by American Thermal Instruments, Dayton, Ohio. Therefore, the amount of radiant energy in the form of light passing through the light window 30 is a direct function of the specific temperature of the light window 30. It thus follows that the amount of the light conveyed from the light source 51 by the first strand 41 of the light-guide pair 40 corresponding to the light window 30 and passed through the light window 30 to the second strand 42 of the light-guide pair 40 and conveyed to the light sensor 52 will be determined by the temperature of the light window 30. The temperature of the light window 30, in turn, is determined by the amount of thermal energy conducted to the light window 30 by the heat conducting temperature probe container 25.

Alternatively, the temperature probe 20 may contain a distinct member that extends from the outside surface 22 of the container 25 into the inner surface 24 of the container 25 and contacts the light window 30 contained therein. In any event, temperature information is received by the temperature probe 20 at the outside surface 22 of the temperature probe container 25 and conveyed to the light window 30, the temperature of which determines the intensity of light measured by the light sensor 52.

For example, if the container 25 of a temperature probe 20 contains a plurality of light windows 38, 68, 98, the specific material of each one of the plurality of light windows 38, 68, 98, can be chosen such that each has a different permeability to light over distinct, substantially continuous ranges of temperature. Thus, the greater the number of light windows, the finer the gradation of temperature ranges that can be registered using the temperature probe 20. In one embodiment of the present invention, for example, a temperature probe 20 might have n light windows each of which is translucent for a distinct temperature range and being otherwise opaque. Thus, by identifying the combination of one or more light windows conveying light, if any, one can identify which of n temperature ranges the temperature of the temperature probe 20 is within.

For example, as perhaps best illustrated in FIGS. 2–3, and 6–7, a plurality of corresponding light sensors can be coupled with a container 25 containing a plurality of light windows 38, 68, 98 to thereby indicate whether and which light window 30 or windows 38, 68, 98 is opaque and which is translucent. The particular permutation of light blocking and light passing light windows will accordingly be reflected by the light sensors and so, too, indicate the particular ambient or surface temperature of the component to which the container 25 is adjacent or in contact. An even more precise measure of temperature, however, can be effected by forming each n light windows, as described above, from a light crystal that has variable perviousness to light over a continuous range of temperatures. By choosing the n light windows to have a different light permeability for n mutually exclusive temperature ranges, one accordingly can adjust the fineness of the temperature measured by a temperature probe 20 to virtually any degree of accuracy.

Figures 6B, 6C, 7:
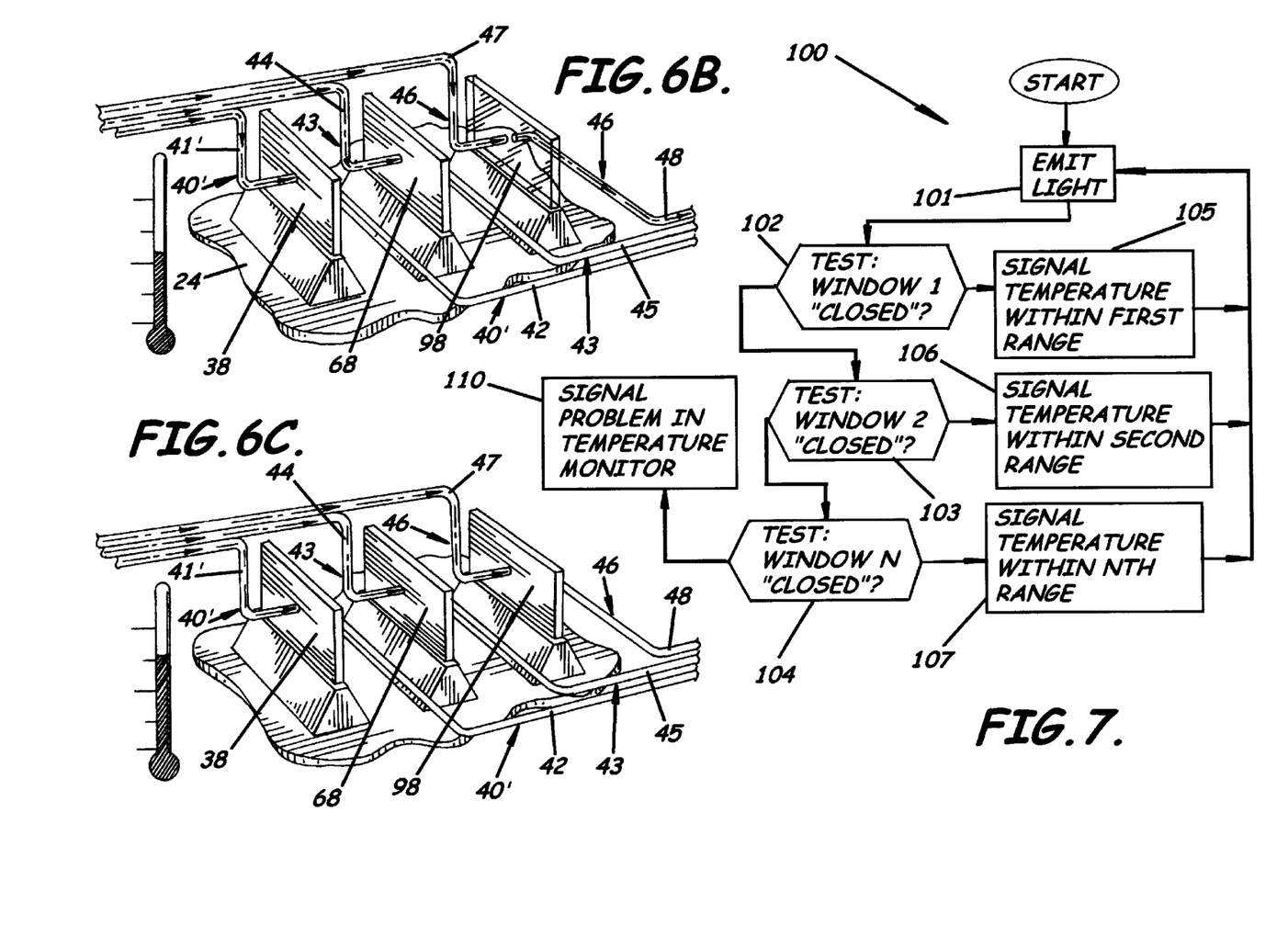
FIG. 7 is a flow diagram illustrating schematically one operative manner of monitoring temperature using a temperature probe according to the present invention.

The system so described can incorporate a processor 120, as understood by those skilled in the art, in communication with the light sensor 52 to facilitate determination of the precise temperature by determining the combination of windows, if any, that are passing light to the light sensors. For example, the light sensor 52 and processor 120 can be provided within a housing 125 external to the electrical generator system 15 (FIG. 1). FIG. 7 illustrates a possible sequencing of steps corresponding to a processor-implemented method 100 of determining for a temperature probe 20 utilizing a plurality of light windows 38, 68, 98. The system initiates the emission of light (Block 101) from the light source 51. Sequential testing (Blocks 102–104) then proceeds. The processor determines whether light is received through or passes through any light windows 38, 68, 98, whether one of the light windows 38 allows light to pass therethrough, whether two of the light windows 38, 68 allow light to pass therethrough, or all three of the light windows 38, 68, 98 allow light to pass therethrough(Blocks 105–107) and correspondingly signals the correct temperature. The processor 120, moreover, can be programmed, as understood by those of ordinary skill in the art, to respond to a specific permutation of light window conditions by signaling a problem within the electrical generator system being monitored (Block 110).

Preferably, the container 25 of the temperature probe 20 is formed of a heat conducting material. The container 25 then can transfer temperature information directly to the one or more light windows 38, 68, 98 contained therein. Alternatively, a separate heat conducting member can extend through the temperature probe container which has a first portion exposed outside the container 25 and second portion directly contacting the one or more light windows 38, 68, 98.

Figures 4, 5, 6A:
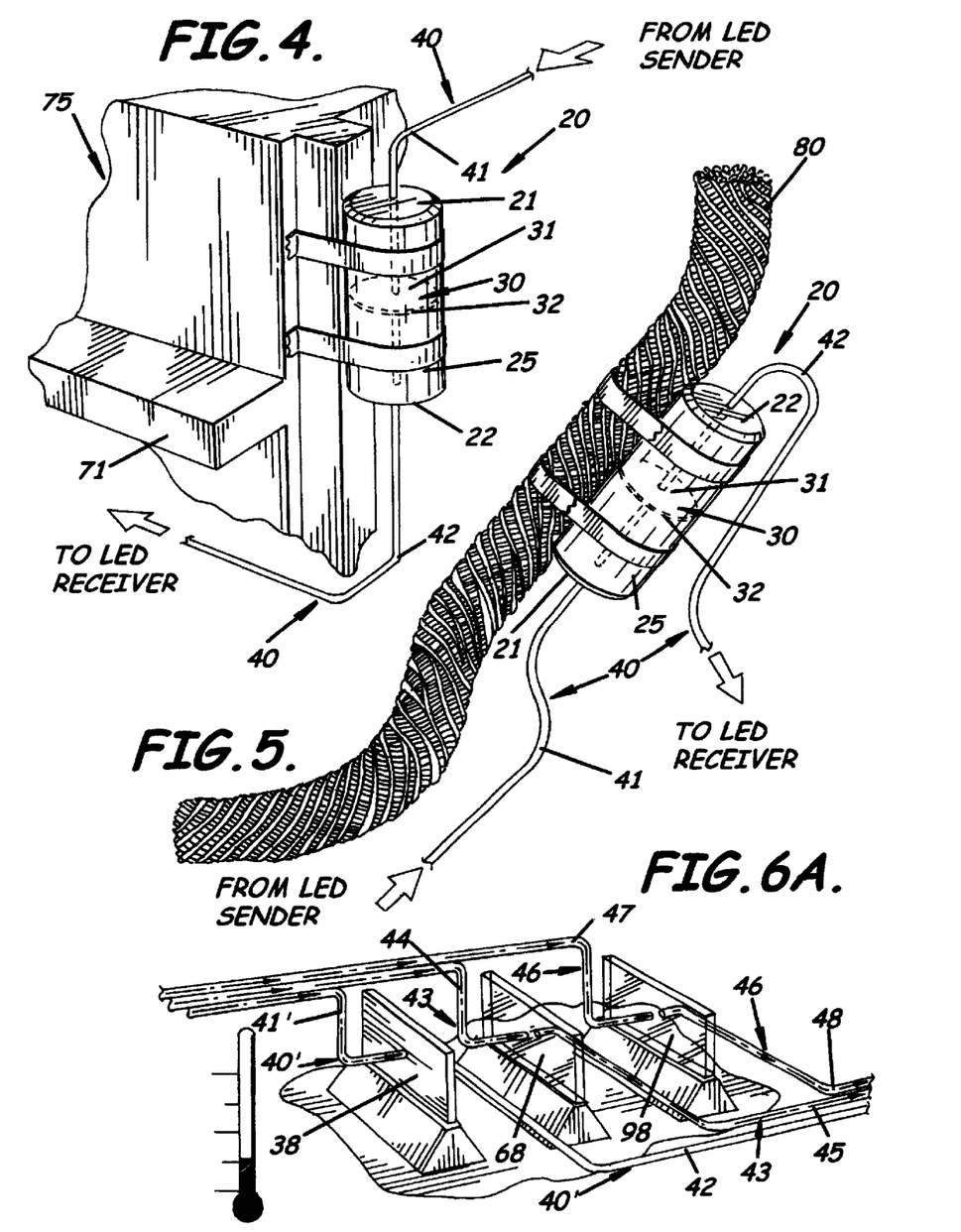
FIG. 4 is a perspective view of a temperature probe connected to a surface portion of a component of an electrical generator system according to the present invention.
FIG. 5 is a perspective view of a temperature probe connected to a segment of wire used in an electrical generator system according to the present invention.
FIGS. 6A–6C are perspective views of three distinct light windows, each illustrated with an associated light guide pair, housed within a temperature probe and responding uniquely to the temperature of the temperature probe according to another embodiment of the present invention.

In either case, as noted above, the temperature probe container 25 can be connected directly to a surface portion of a power generator system component 75 to measure the temperature of the component directly or be positioned adjacent the component to measure the ambient temperature surrounding the component. Specifically, the container 25 can be hung from a system structure so as to contact or remain near the surface of a system component. Alternatively, it can be connected with an appropriately heat-resistant adhesive tape (e.g., electrical tape). As illustrated in FIG. 4, a temperature probe 20 can be taped to a vertical surface 71 portion of a power generator system component 75. A temperature probe 20 similarly could monitor the heat of braided cable 80 by taping the temperature probe 20 directly to the cable 80 as illustrated in FIG. 5. Additionally, a temperature probe 20 can simply be placed so as to rest on a substantially level portion of a surface. Temperature information is therefore received from the select component or the surrounding environment, and the surface or ambient temperature is accordingly conveyed to the one or more light windows 38, 68, 98 to thereby signal the temperature range of the component or its environment.

A particular advantage of the present invention, then, lies in the manner and the nature of the material with which temperature information is so transferred to the one or more light windows 38, 68, 98. Conventional and other optics-based devices and methods rely on gas to transfer heat to a liquid crystal. Although gas molecules, of course, exhibit the well-understood translational (kinetic), rotational, and vibrational molecular energy characteristics that enable them through interaction (collision) with the liquid crystal molecules to transmit heat, the gas molecules are simply too diffuse to make the gas a good thermal conductor. (See, e.g., Serway, Physics, $4^{th}$ ed., 1998, pages 566–569; see also Sonntag, Borgnakke, and Van Wylen, Fundamentals of Thermodynamics, $5^{th}$ ed., 1998; pages 84–85.) Recognizing this problem, the present invention overcomes it by providing for the direct transfer of temperature information (energy) to a light window 30 (preferably, a liquid crystal). Specifically, a heat conducting material is chosen to have at least a semi-fixed, or preferably, fixed molecular structure so as to focus and channel the energy transference such that temperature information is transferred more rapidly and more efficiently to the one or more light windows 38, 68, 98 contained within the heat conducting container 25.

More specifically, the specific properties of such a heat conducting container 25 are perhaps best described quantitatively in terms of Fourier's law of heat conduction:

$$\dot{Q} = -kA\frac{dT}{dx},$$

giving the rate of heat transfer as proportional to the heat conductivity, k, of the material the surface area of contact, A, and the temperature gradient dT/dx. To achieve speedier, more efficient transfer of temperature information (heat), the heat conducting fastener preferably is formed from a material having a value of k greater than 0.1. Although k values for gases range from less than 0.01 to 0.1, the range is 0.1 to 10 for liquids and 1 to 10 for nonmetallic solids. As understood by those skilled in the art, the most efficient temperature information transfer results, however, are achieved by using a metallic container 25: the heat conductivity coefficient, k, of such material will be at least 100.

Figure 8:
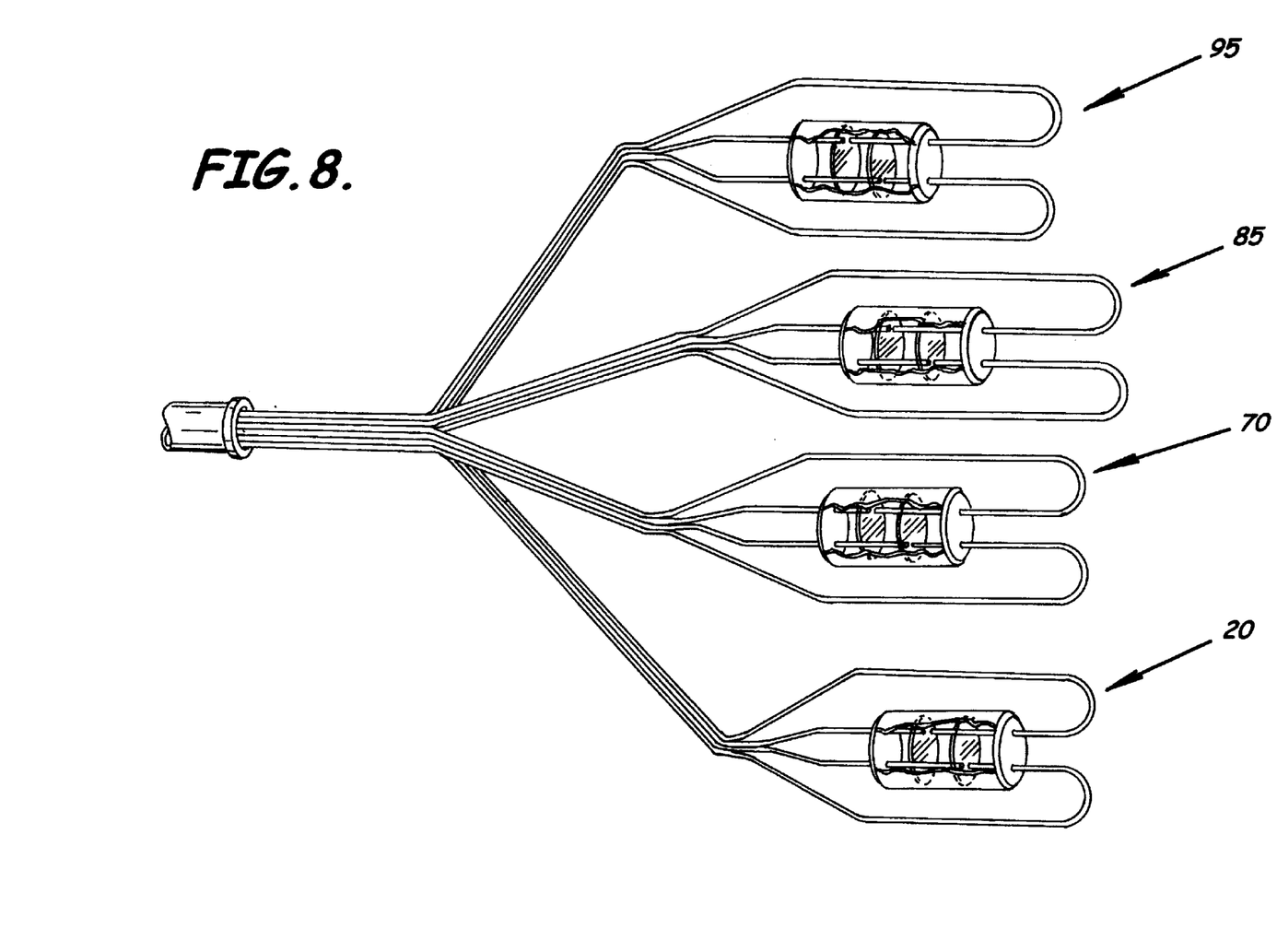
FIG. 8 is a perspective view of a system of four temperature probes containing a plurality of light windows and positioned separately for measuring ambient temperatures in distinct regions or the temperatures of different components within an electrical generator system according to the present invention.

As already noted, a temperature probe 20 is defined by a combination of a heat conducting container 25 and at least one light window 30 contained within the container 25. The temperature probe preferably also contains a light guide pair 40 corresponding to each light window 30 to convey light from a light source 51 and receive any light conveyed through the window 30 so as to signal to a light sensor whether or not light is passing through the light window 30 depending on the particular temperature range of the light window. Using a plurality of such temperature probes 20, 70, 85, 95 one can efficiently monitor and measure the different temperature conditions of a each component in a multiple-component system. For example, as illustrated in FIG. 8, the distinct temperature of each of a number of separate components of a power generator system can be measured using a plurality of temperature probes 20, 70, 85, 95. Therefore, rather than measure the average ambient temperature of a power generation system, the separate temperatures of each component of the system can be measured directly simply by locating a distinct temperature probe 20, 70, 85, 95 adjacent each component whose temperature is to be monitored.

It is advantageous to augment a temperature monitoring system using a plurality of temperature probes 20, 70, 85, 95 with a light signal processor to process temperature information conveyed. The process, if it is part of a programable computer, can indicate for each probe what the particular temperature range is of the surface or environment associated with the particular probe. So augmented, the system can provide capabilities for continuous monitoring of a plurality of power generation components.

It is further a method aspect of the present invention that one can measure temperature ranges of a component of a power generator or other system using the present invention. As illustrated in FIGS. 1–8, temperature can be measured by conveying light to at least one light window 38, 68, 98 contained within a heat conducting container 25, receiving temperature information at the surface of the heat conducting container 25, conveying the temperature information to each at least one light window 38, 68, 98 via heat conduction, and detecting whether light is able to pass through each at least one light window 38, 68, 98. Preferably, the method will utilize a container 25 for the one or more light windows 38, 68, 98 that is made of a material having a heat conducting coefficient greater than 0.1, preferably a metal such as aluminum or other metal having a heat conductivity coefficient of at least 100. Specifically, temperature information can be received as ambient temperature or the temperature of the component to which the heat conducting container 25 is in contact. Thus, a further method aspect of the present invention is conveying temperature information by contacting the heat conducting material to a surface portion of a component of a power generation system.

Yet a further method aspect of the present invention, also illustrated in FIGS. 1–8, is measuring the different temperatures of each component of a power generator or other multiple-component system. A method of measuring temperature conditions of a multiple component system is performed by positioning one of a plurality of heat conducting containers 20, 70, 85, 95 adjacent each system component whose temperature is to be measured, wherein each heat conducting container 20, 70, 85, 95 contains at least one light window 38, 68, 98 therein, and each of the one or more light windows is opaque to light if the temperature of the light window is within a preselected temperature range and is otherwise translucent. Temperature information is received from each system component at an outside surface 22 portion of a corresponding heat conducting container 25 and is conveyed to the at least one light window 38, 68, 98 within the container 25. To measure the temperature range of each corresponding component, one detects whether or not conveyed light is able to pass through each of the one or more light windows 38, 68, 98. Depending on the responsiveness of each light window 38, 68, 98 to distinct temperature ranges, one can determine the ambient temperature surrounding the component or the surface temperature of the particular component by placing the temperature probe 20 near or in contact with the component.

These and other valuable uses of the present invention will come to mind for those skilled in the relevant art. Indeed, many modifications and other embodiments will come to the mind of one skilled in the art and having the benefit of the teachings present in the foregoing descriptions and the associated drawings. Therefore, it is to be understood that the invention is not to be limited to the specific embodiments disclosed herein, and that the modifications and alternative embodiments are intended to be included within the scope of the appended claims.

What is claimed is:
1. A system for detecting temperature comprising:
   at least one light source;
   at least one light sensor; and
   a plurality of spaced-apart optical temperature probes, each optical temperature probe comprising
      a container having an outer surface and an inner surface, the container comprising a heat conductive material for conducting heat between the outer surface and the inner surface,
      at least one light window having first and second surface surfaces, the at least one light window positioned within and contacting the inner surface of the container to be thermally coupled thereto, the at least one light window comprising a material having an opacity based upon a temperature thereof, at least one light-guide pair comprising
  a first light guide having a first end positioned adjacent the at least one light source and a second end positioned adjacent the first surface of a corresponding light window so as to convey light from the at least one light source to the first surface of the corresponding light window, and
  a second light guide having a first end positioned adjacent the second surface of the corresponding light window and a second end positioned adjacent the at least one light sensor so as to capture light passing through the corresponding light window and to convey the light to the at least one light sensor.

2. A system as defined in claim 1 wherein the heat conducting material has a thermal conductivity coefficient greater than 100.

3. A system as defined in claim 1 wherein the at least one light window is opaque to light when the temperature thereof is within a pre-selected temperature range and otherwise transparent to light when the temperature thereof is outside the pre-selected temperature range.

4. A system as defined in claim 1 wherein the outer surface of each optical temperature probe contacts a respective surface of a different component of a power generation system.

5. A system as defined in claim 1 wherein the plurality of spaced-apart optical temperature probes are positioned at different locations within a power generation system.

6. A system as defined in claim 1 further comprising a light sensor processor in communication with the at least one light sensor.

7. A system as defined in claim 1 wherein the container has a cylindrical shape with opposing first and second ends; and wherein the first light guide is carried by the first end of the container, and the second light guide is carried by the second of the container.

8. A system as defined in claim 1 wherein the first and second light guides are electrically insulating.

9. A system as defined in claim 1 wherein the heat conductive material comprises metal.

10. A system as defined in claim 1 wherein the material of the at least one light window comprises a heat sensitive liquid crystal material.

11. A system as defined in claim 1 wherein the at least one window comprises a plurality of windows; and wherein the at least one pair of light guides comprises a plurality of pairs of light guides.

12. An optical temperature probe comprising:
  a container having an outer surface and an inner surface, the container comprising a heat conductive material for conducting heat between the outer surface and the inner surface;
  at least one light window positioned within the container and contacting the inner surface of the container to be thermally coupled thereto, the at least one light window having first and second surfaces and comprising a material having an opacity responsive to a temperature thereof;
  at least one pair of light guides comprising
    a first light guide having a first end to receive light and a second end positioned adjacent the first surface of a corresponding light window to convey light to the first surface of the corresponding light window, and
    a second light guide having a first end positioned adjacent the second surface of the corresponding light window to capture and convey light passing through the corresponding light window to a second end of the second light guide.

13. An optical temperature probe as defined in claim 12 wherein the container has a cylindrical shape with opposing first and second ends; and wherein the first light guide is carried by the first end of the container, and the second light guide is carried by the second of the container.

14. An optical temperature probe as defined in claim 12 wherein the first and second light guides are electrically insulating.

15. An optical temperature probe as defined in claim 12 wherein the heat conductive material comprises metal.

16. An optical temperature probe as defined in claim 12 wherein the material of the at least one light window comprises a heat sensitive liquid crystal material.

17. An optical temperature probe as defined in claim 12 wherein the at least one window comprises a plurality of windows; and wherein the at least one pair of light guides comprises a plurality of pairs of light guides.

18. An optical temperature probe as defined in claim 12 wherein the heat conducting material has a thermal conductivity coefficient greater than 100.

19. An optical temperature probe as defined in claim 12 wherein the at least one light window is opaque to light when the temperature thereof is within a pre-selected temperature range and otherwise transparent to light when the temperature thereof is outside the pre-selected temperature range.

20. An optical temperature probe as defined in claim 12 further comprising a light source connected to the first end of the first light guide, a light sensor connected to the second end of the second light guide, and a light sensor processor in communication with the light sensor.

21. A method for making a temperature probe comprising:
  providing a container having an outer surface and an inner surface, the container comprising a heat conductive material for conducting heat between the outer surface and the inner surface;
  positioning at least one light window within the container and contacting the inner surface of the container to be thermally coupled thereto, the at least one light window having first and second surfaces and comprising a material having an opacity responsive to a temperature thereof;
  coupling a first end of a first light guide to receive light and coupling a second end of the first light guide adjacent the first surface of a corresponding light window to convey light to the first surface of the corresponding light window; and
  coupling a first end of a second light guide adjacent the second surface of the corresponding light window to capture and convey light passing through the corresponding light window to a second end of the second light guide.

22. A method as defined in claim 21 wherein the heat conducting material has a thermal conductivity coefficient greater than 100.

23. A method as defined in claim 21 wherein providing the container comprises providing the container to have a cylindrical shape with opposing first and second ends; and wherein the first light guide is carried by the first end of the container, and the second light guide is carried by the second of the container.

24. A method as defined in claim 21 wherein the first and second light guides are electrically insulating.

* * * * *